US008441465B2

(12) United States Patent
Radivojevic et al.

(10) Patent No.: US 8,441,465 B2
(45) Date of Patent: May 14, 2013

(54) APPARATUS COMPRISING AN OPTICALLY TRANSPARENT SHEET AND RELATED METHODS

(75) Inventors: Zoran Radivojevic, Cambridge (GB); Paul Beecher, Cambridge (GB)

(73) Assignee: Nokia Corporation, Espoo (FI)

( * ) Notice: Subject to any disclaimer, the term of this patent is extended or adjusted under 35 U.S.C. 154(b) by 598 days.

(21) Appl. No.: 12/542,373

(22) Filed: Aug. 17, 2009

(65) Prior Publication Data

US 2011/0037707 A1 Feb. 17, 2011

(51) Int. Cl.
*G06F 3/042* (2006.01)
(52) U.S. Cl.
USPC .................................. 345/175; 178/18.09
(58) Field of Classification Search .......... 345/173–179; 178/18.01–18.09, 19.01–19.06, 20.01–20.04
See application file for complete search history.

(56) References Cited

U.S. PATENT DOCUMENTS

| 7,755,607 | B2 * | 7/2010 | Poupyrev et al. | 345/156 |
| 7,952,566 | B2 * | 5/2011 | Poupyrev et al. | 345/173 |
| 8,098,234 | B2 * | 1/2012 | Lacroix et al. | 345/173 |
| 2006/0049920 | A1 * | 3/2006 | Sadler et al. | 340/407.1 |
| 2006/0119586 | A1 | 6/2006 | Grant et al. | |
| 2007/0139167 | A1 | 6/2007 | Gilson et al. | 340/407.1 |
| 2008/0024459 | A1 * | 1/2008 | Poupyrev et al. | 345/173 |
| 2008/0120029 | A1 | 5/2008 | Zelek et al. | 701/213 |
| 2008/0198139 | A1 * | 8/2008 | Lacroix et al. | 345/173 |
| 2009/0073112 | A1 | 3/2009 | Basson et al. | 345/156 |
| 2009/0085878 | A1 * | 4/2009 | Heubel et al. | 345/173 |
| 2009/0167704 | A1 * | 7/2009 | Terlizzi et al. | 345/173 |
| 2010/0238114 | A1 * | 9/2010 | Vartanian et al. | 345/168 |
| 2010/0280713 | A1 | 11/2010 | Stahlin et al. | 701/41 |
| 2011/0204119 | A1 * | 8/2011 | McCuen | 227/175.1 |

FOREIGN PATENT DOCUMENTS

| EP | 1 406 150 A1 | 4/2004 |
| EP | 1 939 712 A1 | 7/2008 |
| EP | 2 124 131 A2 | 11/2009 |
| WO | 2009/002605 A1 | 12/2008 |
| WO | 2009/042424 A1 | 4/2009 |
| WO | WO-2009/045996 A2 | 4/2009 |
| WO | 2009/085060 A1 | 7/2009 |
| WO | WO-2009/085060 A1 | 7/2009 |
| WO | WO-2009/097866 A1 | 9/2009 |
| WO | WO-2009/120925 A2 | 10/2009 |
| WO | WO-2009/147282 A1 | 12/2009 |

OTHER PUBLICATIONS

Written Opinion dated Oct. 25, 2010.
International Search Report dated Oct. 25, 2010.
Kurt A. Kaczmarek, Polarity Effect in Electrovibration for Tactile Display, IEEE Transactions on Biomedical Engineering, vol. 53, No. 10, Oct. 2006, p. 2047..p. 2054.
"Applications of a Miniature Pin-Array Tactile Module for a Mobile Device", Tae-Heon Yang et al., International Conference on Control, Automation and Systems, Oct. 2008, pp. 1301-1304.

(Continued)

*Primary Examiner* — Vijay Shankar
(74) *Attorney, Agent, or Firm* — Harrington & Smith

(57) ABSTRACT

An apparatus includes an optically transparent sheet having an electrically conductive layer, an electrode element, and electro-vibration circuitry configured to provide a time-varying voltage signal across the electrically conductive layer and the electrode element so as to cause a user to experience electro-vibration in a first body part of the user when the first body part is moved across an exterior surface of the optically transparent sheet while a second body part of the user is in contact with the electrode element.

21 Claims, 8 Drawing Sheets

OTHER PUBLICATIONS

"Vibrotactile Display for Hand-held Input device Providing Spatial and Directional Information", Gi-Hun Yang et al., IEEE 2009, pp. 79-84.

"Vibrotactile Feedback Systems: Current Trends in Rehabilitation, Sports and Information Display", A U. Alahakone et al., IEEE 2009, pp. 1148-1153.

"Tactile Displays: Guidance for Their Design and Application", Lynette A. Jones et al., Human Factors, vol. 50, No. 1, Feb. 2008, pp. 90-111.

"Virtual Reality Aided Assembly with Directional Vibro-Tactile Feedback", Holger Regenbrecht et al., 7 pgs., 2005.

* cited by examiner

APPARATUS COMPRISING AN OPTICALLY TRANSPARENT SHEET AND RELATED METHODS

FIELD

The invention relates to apparatuses comprising an optically transparent sheet, the optically transparent sheet comprising an electrically conductive layer.

BACKGROUND

It is known to provide tactile feedback to users of touch screen displays. Methods for providing tactile feedback include vibration of the device in which the to touch screen display resides. Such vibration may be provided by, for example, piezoelectric or mechanical actuators.

SUMMARY

This specification describes an apparatus comprising an optically transparent sheet comprising an electrically conductive layer, an electrode element, and electro-vibration circuitry configured to provide a time-varying voltage signal across the electrically conductive layer and the electrode element so as to cause a user to experience electro-vibration in a first body part of the user when the first body part is moved across an exterior surface of the optically transparent sheet while a second body part of the user is in contact with the electrode element.

This specification also describes an apparatus comprising an optically transparent sheet comprising an electrically conductive layer, an electrode element, a detector configured to detect a user touch input on the optically transparent sheet by detecting a current in the electrically conductive layer, and electro-vibration circuitry configured to provide a time-varying voltage signal across the electrically conductive layer and the electrode element in response to detecting a user touch input on the optically transparent sheet.

This specification also describes a method comprising detecting a touch input on an optically transparent sheet by detecting an electric current in an electrically conductive layer, the electrically conductive layer constituting part of the optically transparent sheet, and in response to detecting a user touch input on the optically transparent sheet, providing a time varying voltage signal across the electrically conductive layer and an electrode element.

DETAILED DESCRIPTION OF EMBODIMENTS

Figure 1:
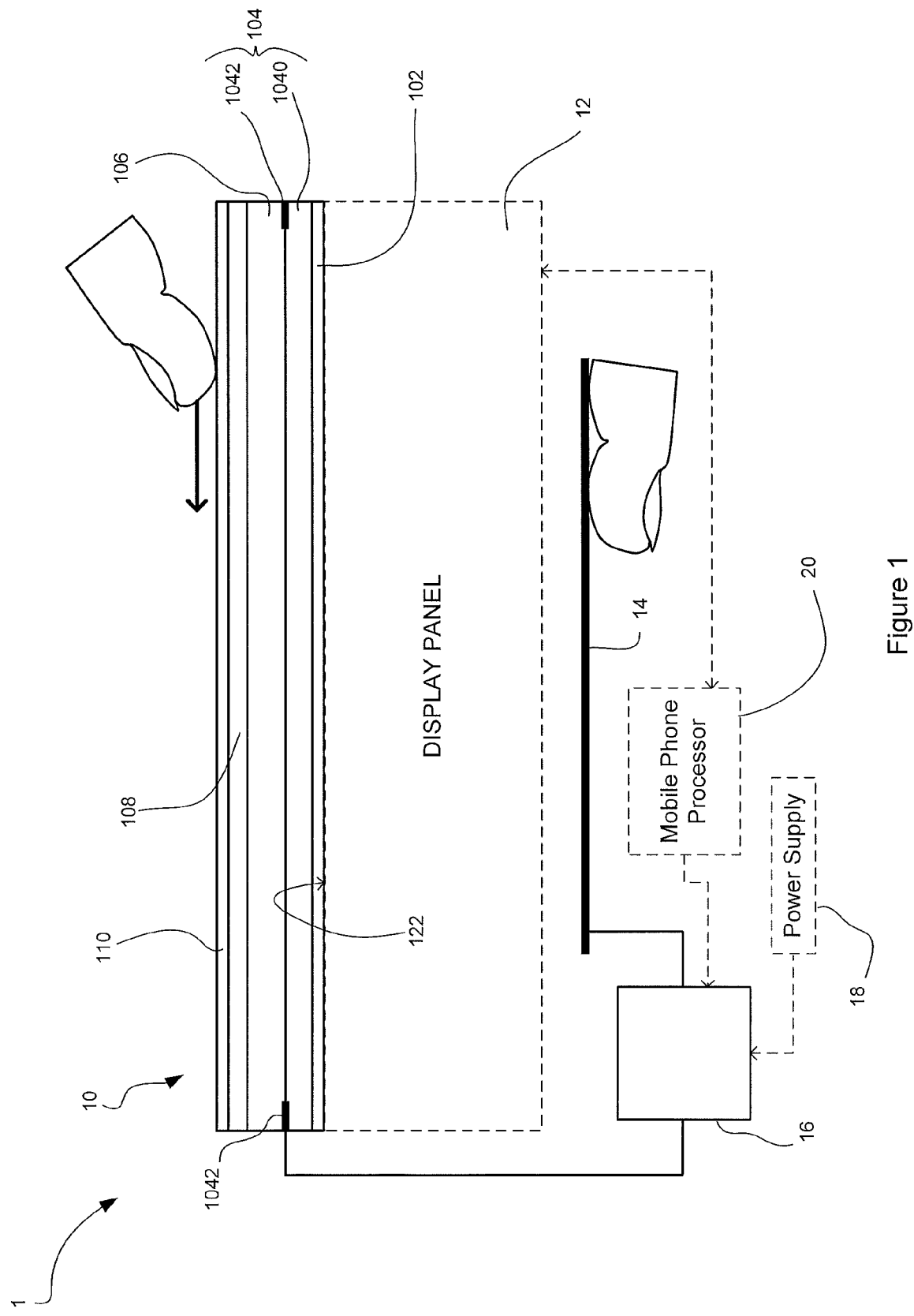
FIG. 1 is a schematic cross-sectional view of an exemplary embodiment of an apparatus for providing tactile feedback to a user of a portable electronic device.

FIG. 1 is a schematic cross-sectional view of an embodiment of an electro-vibration apparatus 1 for providing tactile feedback to a user of a portable electronic device. The electro-vibration apparatus 1 comprises a transparent electro-vibration film 10 which is suitable for overlying a display panel 12, for example an LCD display panel, of an electronic device (not shown in full in FIG. 1). The transparency of the transparent electro-vibration film 10 allows images displayed on the display panel 12 to be seen clearly by a user through the transparent electro-vibration film 10.

The electro-vibration apparatus 1 also comprises a rear electrode 14 and feedback circuitry 16. The feedback circuitry 16 is in electrical connection with the transparent electro-vibration film 10 and the rear electrode 14. The function and operation of the feedback circuitry 16 will be described in some detail later in this specification. The feedback circuitry 16 is adapted to receive power from a power supply 18, for example, a battery of a mobile phone. Also, as will be discussed in more detail later in this specification, the feedback circuitry 16 may receive data signals from the processor 20 which controls the display screen, for example, the processor of a mobile phone. The rear electrode 14 is in electrical communication with the transparent electro-vibration film 10. The rear electrode may comprise any suitable conductive material, for example films of silver, gold, nickel, copper, aluminium, carbon or metallic coated polymers.

The transparent electro-vibration film 10 comprises a substrate layer 102. When the transparent electro-vibration film 10 is overlying a display panel 12, the to substrate layer is adjacent a display, or upper, surface 122 of the display panel 12. It will be appreciated, however, that additional transparent layers (not shown) may be interposed between the substrate layer 102 and the display surface 122 of the display panel 12. Such interposing layers may include an adhesive layer (not shown) for adhering the transparent electro-vibration film 10 to the display surface 122 of the display panel 12. The substrate layer 102 may comprise, for example, a polymer film, or a glass or plexiglass sheet. The substrate layer 102 may have a thickness in the range of, for example, 10 nm to 100 µm. Alternatively, the substrate layer 102 may have a thickness in the range of, for example, 1 µm to 100 µm. The substrate layer may be flexible.

The transparent electro-vibration film 10 further comprises a conductive electrode layer 104. The conductive electrode layer 104 is provided atop the substrate layer 102. That is to say, the conductive electrode layer 104 is provided adjacent a surface of the substrate layer 102 that is the least proximal to the display panel 12, when the transparent electro-vibration film 100 is in position atop a display panel 12. The conductive electrode layer 104 comprises a transparent electro-vibration electrode 1040 and plural contact electrodes 1042.

The transparent electro-vibration electrode 1040 comprises a layer of transparent electrically conductive material. The transparent electro-vibration electrode 1040 may be provided over the entire surface of the substrate layer 102. Alternatively, the transparent electro-vibration electrode 1040 may be provided atop only part of the surface of the substrate layer 102. For example, the transparent electro-vibration electrode 1040 may be provided atop a middle region (not indicated on the Figures) of the surface of the substrate layer 102, but not on a perimeter region (not indicated on the Figures) of the surface of the substrate layer 102. The transparent electro-vibration electrode 1040 comprises a layer of Indium Titanium Oxide (ITO). The thickness of the transparent electro-vibration electrode 1040 may be, for example, in the range of several hundred nano-meters, for example, 100 nm to 1. It will be appreciated that the transparent electro-vibration electrode may alternatively comprise, for example, a carbon nanotube (CNT) network, a thin layer, of for example 10 nm, of gold, silver or aluminium, or any other suitable transparent conductor.

The plural contact electrodes 1042 are distributed around the perimeter of the transparent electro-vibration electrode 1040. According to some embodiments, including that depicted in FIG. 5, the plural electrodes are located at the corners of the transparent electro-vibration electrode 1040. In such embodiments, the number of contact electrodes is dependent on the shape of the transparent electro-vibration electrode 1040. In embodiments such as that depicted in FIG. 3A and FIG. 5, where the transparent electro-vibration electrode 1040 (and also the transparent electro-vibration film 10 itself) is rectangular, there are four contact electrodes 1042-1 to 1042-4 (see FIG. 3). One contact electrode 1042 is located at each corner of the transparent vibration electrode 1040. The provision of the contact electrodes 1042 allow an electric signal to be provided, via the contact electrodes 1042, to the transparent electro-vibration electrode 1040. Also, as will be discussed in more detail later, the provision of the contact electrodes allows the transparent electro-vibration film 10 to be used in detecting and identifying a location of an incident touch input. The plural contact electrodes may comprise, for example, trace amounts of silver, gold, aluminium or copper.

The transparent electro-vibration film 10 comprises also a dielectric layer 106 located atop the conductive electrode layer 104. That is to say, the dielectric layer 106 covers the conductive electrode layer. The conductive electrode layer 104 is thus interposed between the substrate layer 102 and the dielectric layer 106. The dielectric layer 106 comprises a transparent material. The dielectric layer comprises a high-K dielectric material. The high-K dielectric material may include, but is not limited to, hafnium oxide, aluminium oxide or titanium dioxide. The dielectric layer may have a thickness in the range of, for example, 100 nm to 1 μm. The dielectric layer 106 prevents direct galvanic contact between the conductive electrode layer 104 and a user's finger when placed on an external surface of the transparent electro-vibration film 10.

Atop the dielectric layer 106 is provided a protective layer 108. The protective layer 108 protects the layers beneath it, such as the dielectric and conductive electrode layers 104, 106 from damage by external influences, including water and other contaminants. The protective layer 108 also has anti-scratch properties and/or anti-reflection properties. The protective layer 108 may comprise, for example, diamond arc, a diamond-like carbon coating or a hard polymer. The protective layer 108 may have a thickness in the range of, for example, 1 nm to 100 nm. Alternatively, the protective layer 108 may have a thickness in the range of, for example, 10 nm to 50 nm.

Provided adjacent, or atop, the protective layer 108 is a hydrophilic layer 110. The hydrophilic layer 110 constitutes the external surface of the transparent electro-vibration film 10. The hydrophilic layer 110, the construction and operation of which will be described later with reference to FIG. 4, removes moisture from the to user's finger. As will be discussed, this improves the operability of the transparent electro-vibration film 10 to provide electro-vibration to the user.

Figure 2:
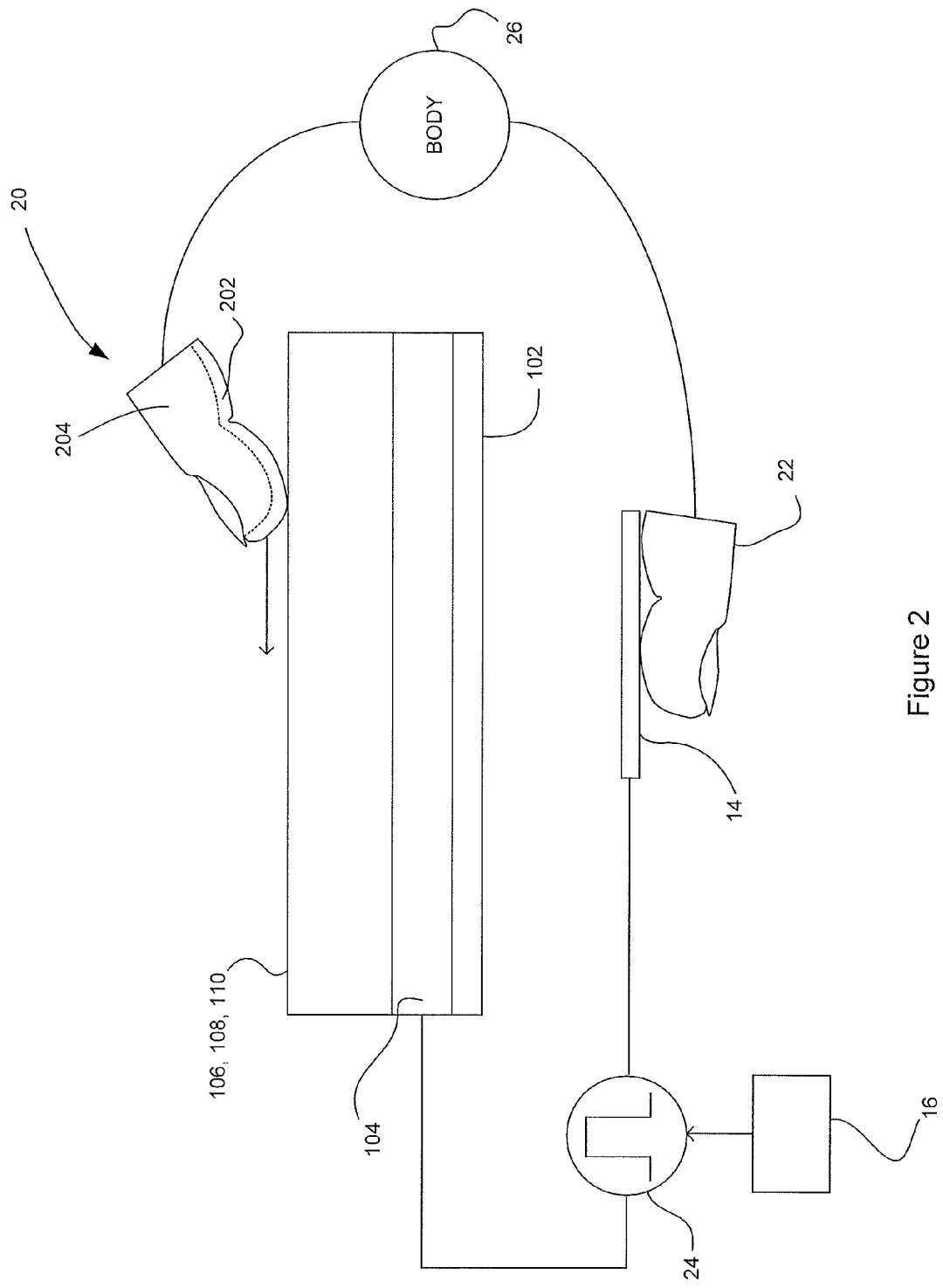
FIG. 2 is a schematic cross sectional view of a portion of the apparatus of FIG. 1 for illustrating the phenomenon of electro-vibration.

The phenomenon of electro-vibration, and the way in which the electro-vibration apparatus 1 operates to provide electro-vibration to a user, will now be described with reference to FIG. 2. FIG. 2 is a schematic cross-sectional view of a portion of the electro-vibration apparatus of FIG. 1. For illustrative purposes, the dielectric, protective and hydrophilic layers 106, 108, 110 are shown as a composite dielectric layer.

Electro-vibration is an effect that occurs when a first body part of a user, for example a finger tip, is slid along a conductive surface and a second body part of a user, for example a palm of a hand, is in electrical communication (which includes being in contact via ground) with a second conductive element, while a time-varying potential is applied across the conductive surface and the second conductive element.

The human skin is comprised of many different layers, the outermost of which is the stratum corneum. The stratum corneum has high electrical impedance compared to the deeper, relatively conductive layers of the skin. Thus, when a finger tip is placed on a conducting surface, the stratum corneum could be considered the dielectric of a capacitor, with the plates being the conducting surface and the relatively conductive deeper layers of the skin. When a potential is applied across two capacitor plates which are moveable relative to one another, the dielectric between the plates experiences a compression force due to the electrostatic attraction between the two plates. Consequently, when a potential is applied across the conductive surface and the second conductive element, which is electrically connected to the relatively conductive layer of skin of the finger tip, via the second body part and the body itself, the stratum corneum is compressed slightly. There are no nerve endings in the stratum corneum and thus this compression is not sensed.

Let us now consider this compression force with reference to FIG. 2. In FIG. 2, a first body part, for example a first finger 20, which comprises the stratum corneum 202 and the deeper relatively conductive skin layers 204, is in contact with the surface transparent electro-vibration film 10, and a second body part 22, for example a second finger or a palm, is in contact with the rear electrode 14. A time-varying signal 24 provided by the feedback circuitry 16, is applied across the conductive electrode layer 104 of the transparent electro-vibration film 10 and the rear electrode 14. The first and second body parts 20, 22 are in electrical connection via the body 26 of the user. If an AC signal is used for the time-varying potential, the electrical loop formed by the first and second body parts 20, 22, the body 26 of the user, feedback circuitry 16, the transparent electro-vibration film 10 and the rear electrode, may be termed a closed AC electric loop.

At a point in time, the time varying potential results in an electrostatic attraction between the deeper relatively conductive skin layers 204 and the conductive electrode layer 104. As such, the stratum corneum 202 experiences a compression force, $f_e(t)$. The compression force, $f_e(t)$, is dependent on the magnitude of the time-varying potential, the dielectric constants of the stratum corneum 202 and the composite dielectric layer 106, 108, 110. As mentioned above, this compression cannot be sensed by the user.

Now let us consider what happens when the first finger is slid across the surface of the transparent electro-vibration film 10. The frictional force, $f_f(t)$, on the finger tip is given by:

$$f_f(t) = \mu[F_u + f_e(t)]$$

where μ is the coefficient of dynamic friction and $F_u$ is the normal force applied by the user.

The frictional force, $f_f(t)$, results in a shear force which deforms the skin and which is detectable by the nerves in the skin. As the compression force, $f_e(t)$, experienced by the stratum corneum 202 varies with the time varying potential so too does the shear force, $f_f(t)$. As such, as the time varying potential provided by the feed back circuitry 16 oscillates at a particular frequency, so too does the shear force. This oscillating shear force is sensed as a vibration of the finger tip and can be termed electro-vibration.

Electro-vibration is detectable by a user in a frequency range of approximately 0.5 Hz to 5000 Hz. The detection threshold for the zero-to-peak amplitude of the time varying potential has been found to be as low as 12V (at 50 Hz).

Referring back to the electro-vibration apparatus 1 of FIG. 1, the feedback circuitry is operable to provide a time varying potential across the conductive electrode layer 104 and the rear electrode. The perceived amplitude of the electro-vibration signal may be adjustable by the user of the electro-vibration apparatus 1. For example, the user may be able to select a voltage for the electro-vibration signal in the range of 10V to 200V. In this way, the user can set the feedback to a level which is most suited to them. The feedback circuitry may comprise charge limitation circuitry (not shown in the Figures), which allows the voltage of the feedback signal to be relatively high by limiting the total charge per pulse, and thus also the current, to a safe level. The charge per pulse is limited to a level which is below the threshold for providing electrocutaneous nerve stimulation, for example a charge equivalent to current of 1 mA. Electrocutaneous nerve stimulation is direct stimulation of the nerve in the skin as a result of a current passing therethrough.

The electro-vibration apparatus 1 is also operable to determine the incidence and location of a touch input. With a closed loop system, such as that shown in FIGS. 1 and 2, it is possible to measure the resistance of a path on the transparent electro-vibration electrode 1040 between a finger 20 incident on the transparent electro-vibration film 10 and any of the contact electrodes. By determining the resistances of the paths from the finger 20 to each of the contact electrodes 1042, it is possible to determine the location of the finger. This technique for determining a location of the touch input may be termed the 4-R measurement technique.

An exemplary operation of the electro-vibration apparatus 1 to provide tactile feedback to the user of the portable display device which includes the electro-vibration apparatus 1 will now be described with reference to FIGS. 3A and 3B.

Figure 3A:
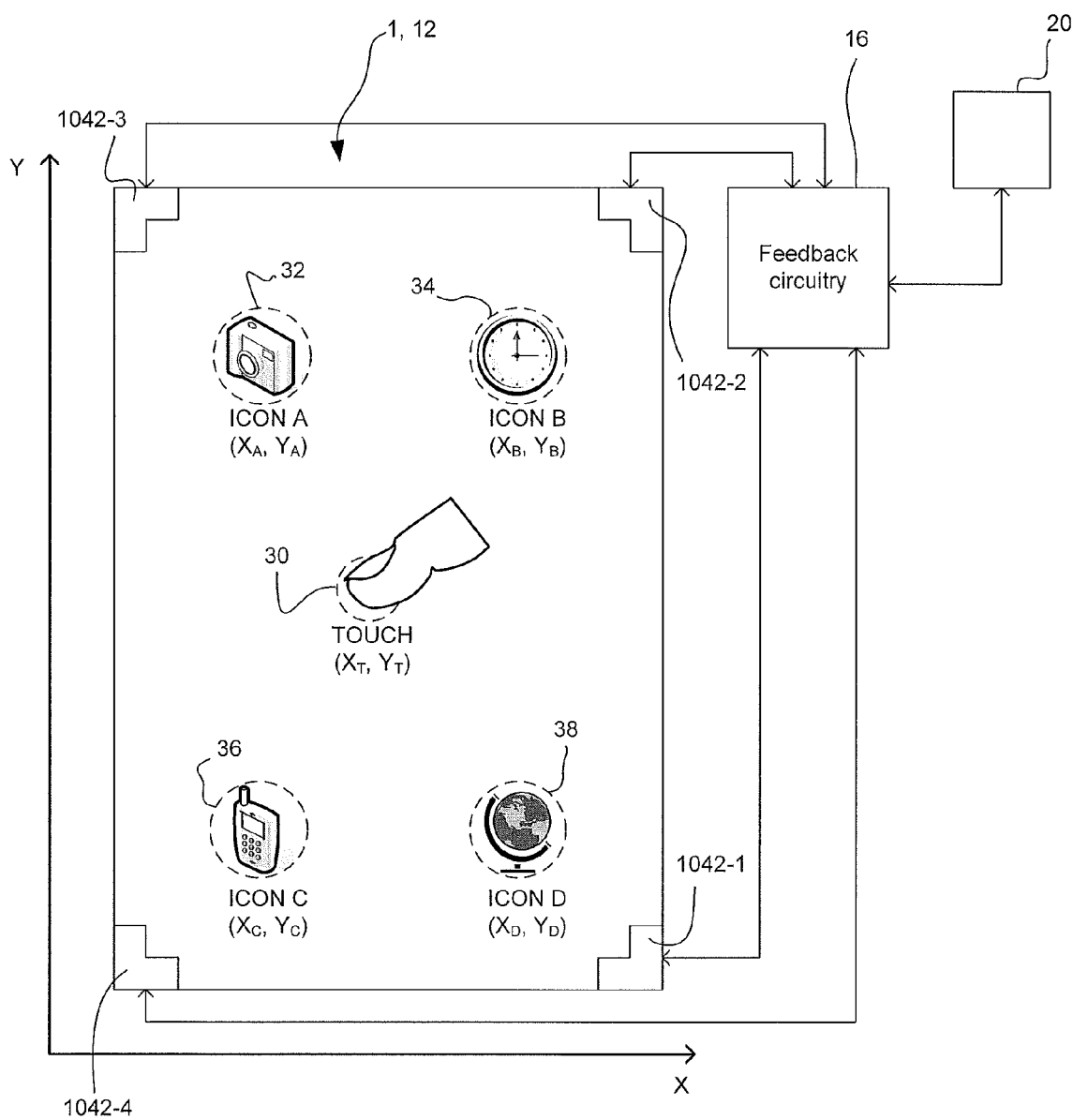
FIG. 3A is a plan-view of a portion of the apparatus of FIG. 1.

FIG. 3A is a schematic plan view of the transparent electro-vibration film 10 of the electro-vibration apparatus 1 overlying the display screen 12. Each of the contact electrodes 1042-1 to 1042-4 is electrically connected to the feedback circuitry to 16. The feedback circuitry 16 is thus operable to determine the resistances of the paths between a touch input 30 and each of the four contact electrodes 1042. In this way, the feedback circuitry 16 determines the location $(X_T, Y_T)$ of the touch input 30.

The feedback circuitry 16 is in data communication with the processor 20, which controls the display panel 12. The feedback circuitry 16 is operable to receive from the processor 20 data identifying locations on the display panel 12 of objects displayed by the display panel 12. In FIG. 3, the display panel is displaying four objects, ICON A 32, ICON B 34, ICON C 36 and ICON D 38. Icons A to D are located at locations $(X_A, Y_A)$, $(X_B, Y_B)$, $(X_C, Y_C)$ and $(X_D, Y_D)$ respectively. Thus, data identifying these locations is received by the feedback circuitry 16 from the display processor 20.

Figure 3B:
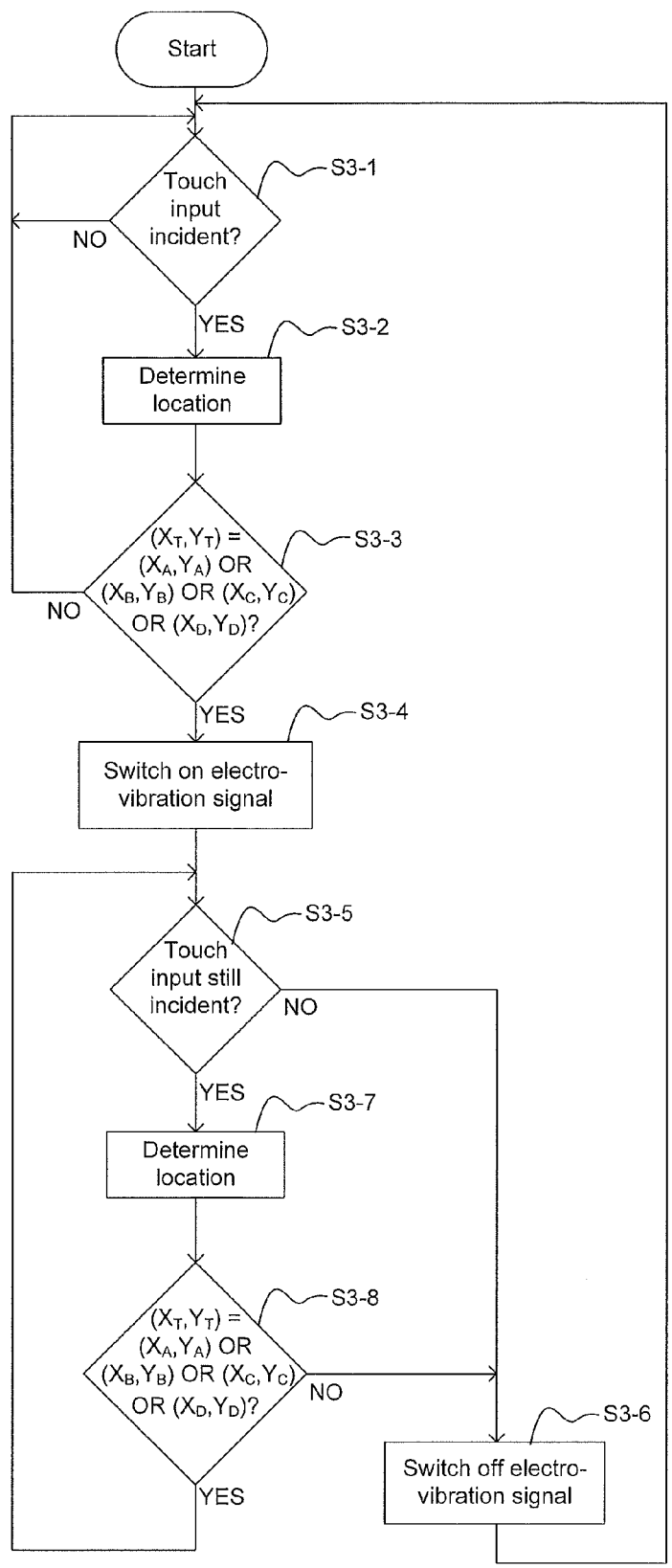
FIG. 3B is a flow-chart illustrating an operation of the apparatus of FIG. 1.

The flow chart of FIG. 3B illustrates an exemplary operation of the feedback circuitry 16 to provide feedback to a user.

In step S3-1, the feedback circuitry 16 determines if a touch input is detected on the transparent electro-vibration film 10. This is determined based on the feedback circuitry 16 detecting that the circuit comprised of the transparent electro-vibration film 10, the rear electrode 14 and the body 26 of the user has been completed.

If a touch input is not detected, the operation returns to step S3-1 and awaits detection of a touch input. If an input is detected, the operation proceeds to step S3-2 and determines the location of the input $(X_T, Y_T)$. This is determined using the 4-R measurement technique discussed above. Once the location $(X_T, Y_T)$ of the touch input is determined, the operation proceeds to step S3-3.

In step S3-3, the operation determines if the location of the touch input $(X_T, Y_T)$ 30 is equal to the location $(X_A, Y_A)$, $(X_B, Y_B)$, $(X_C, Y_C)$, $(X_D, Y_D)$ of one of the icons 32, 34, 36, 38 displayed on the display panel 12. If the location $(X_T, Y_T)$ of the touch input is not equal to the location of the one of icons 32, 34, 36, 38, the operation returns to step S3-1. If, however, the feedback circuitry determines that the location of the touch input $(X_T, Y_T)$ is equal to the location of one of the icons the operation proceeds to step S3-4.

In step S3-4, following a positive determination that the location of the touch input $(X_T, Y_T)$ is equal to the location of one of the icons, the feedback circuitry switches on an electro-vibration signal which is provided across the conductive electrode layer 104 and the rear electrode 14. This signal may comprise, for example, a time-varying potential having a frequency in the range of, for example, 5 Hz to 500 Hz and having a zero to peak amplitude of, for example, 12 V. A suitable pulse shape for the electro-vibration signal is, for example, a pulse having a very rapid rise time, for example 1-2 ms, and having a relatively short duration, for example 10 ms. Such pulses may be repeated with basic frequency (5-500 Hz). The use of a pulse-shape such as this limits the total charge transmitted through the skin. In this way, as a user slides their finger onto and over an area of the transparent electro-vibration film 10 corresponding to a displayed icon, electro-vibration will be experienced.

Following step S3-4, the operation proceeds to step S3-5. In step S3-5, the feedback circuitry determines if the touch input is still detected. In the event of a negative determination, the operation proceeds to step S3-6. In step S3-6, the feedback circuitry 16 switches off the electro-vibration signal. Thus, if a user input is no longer detected, the electro-vibration signal is switched off.

If in step S3-5 it is determined that a touch input is still incident, the electro-vibration signal remains switched on and the operation proceeds to step S3-7. In step S3-7, the feedback circuitry 16 determines the location of the touch input. Following this, in step S3-8, the feedback circuitry determines if the location $(X_T, Y_T)$ of the touch input is equal to the locations of one of the icons. Following a positive determination, the electro-vibration signal remains switched on and the operation returns to step S3-5. If, in step S3-8, it is determined that the location $(X_T, Y_T)$ of the touch input is not equal to the location of one of the icons, the operation proceeds to step S3-6 in which the feedback circuitry switches off the electro-vibration signal. Thus, the user will no longer sense the electro-vibration.

Following step S3-6, the operation returns to step S3-1 and awaits detection of a touch input.

In the above operation, the locations of the touch input and the icons have been denoted as a single coordinate $(X, Y)$. It will be understood however, that, in practice, depending on the resolution of the transparent electro-vibration film 10 and the display, the touch input and icons may instead have a range of associated coordinates. Thus, in steps S3-3 and S3-8, the feedback circuitry may instead determine if one of the coordinates denoting touch input is within one of the coordinate ranges identifying the icons. In this way, the electro-vibration signal may be switched on when the user crosses from outside to inside a boundary (not labelled) defining an icon, and may be switched off when the user crosses from inside to outside the boundary.

In addition to the locations of the icons, the display processor 20 may also provide the feedback with other information about each icon. Such information may include, for example, frequency of the use. Thus, the feedback circuitry 16 may provide a different electro-vibration signal, for example a signal having different frequency or potential, for those icons that are more commonly selected than for those which are less commonly selected.

Displayed icons may comprise different colours. An indication of the colour may be passed from the display processor 20 to the feedback circuitry 16. Thus, the feedback circuitry 16 may provide a different electro-vibration signal having, for example, a different frequency dependent on a colour of the icon. In this way, the electro-vibration signal associated with a red icon may have a lower frequency, for example, 100 Hz, than that associated with a blue icon, for example, 250 Hz.

In addition to identifying the location of a touch input for the purpose of providing electro-vibration to a user, the feedback circuitry 16 may also be used to detect input commands, for example the selection of one of the icons displayed on the display. Thus, if the feedback circuitry 16 determines that the location of a touch input corresponds to the location of one of the icons 32, 34, 36, 38, the feedback circuitry 16 may send a signal to the processor 20 of the portable device indicating that an input in relation to a particular icon has been received. Upon receiving this signal, the processor 20 may perform an operation relating to the icon selected.

As discussed, the phenomenon of electro-vibration results from an induced change in the frictional force between the user's finger and the surface of the transparent electro-vibration film 10. Thus, by changing the potential and frequency of the electro-vibration signal, it is possible to simulate to the user the perception of touching various different textures of surface. For example, by increasing the potential to from, for example, 20 to 30V), the change in frictional force will be greater, and thus the user will perceive a more pronounced effect, which may feel like a coarser texture (i.e. perceived protuberances will appear larger in height). Similarly, by using a higher frequency signal, for example 700 Hz instead of 300 Hz), the user will perceive a texture having a greater number of protuberances per unit distance. Also, the perception of running a finger over a step in the surface can be simulated. This can be achieved, for example, by switching on the signal for only a short period of time as the user moves their finger over a small region of the transparent electro-vibration film 10. Thus, the user will perceive a normal level of friction, followed by an increased level of friction for a short time, which simulates the step, followed by a normal level of friction. In this way it is possible to simulate the presence of, for example, raised buttons and the like.

It will be understood that by varying the frequency and potential of the electro-vibration signal and the period of time for which the signal is applied, the electro-vibration apparatus is fully programmable. Thus, a great number of different textures and surface profiles can be simulated.

Figure 4:
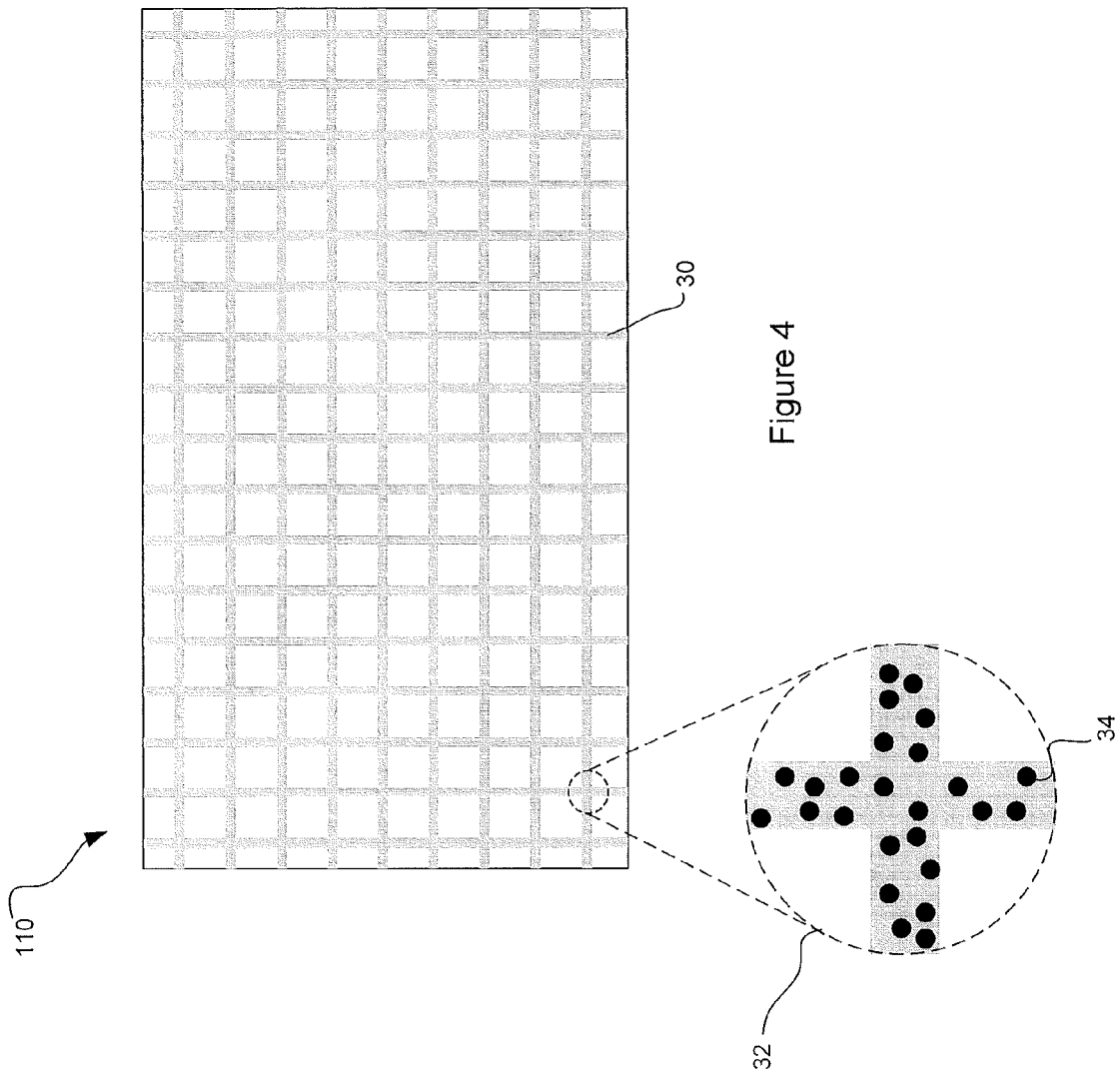
FIG. 4 is an enlarged schematic view of a hydrophilic layer of the electro-vibration apparatus of FIG. 1.

FIG. 4 is a schematic close-up view of the hydrophilic layer 110 of the transparent electro-vibration film 10. The hydrophilic layer 110 comprises a grid, or mesh, of hydrophilic strips 30 provided directly atop the protective layer 108. The hydrophilic strips may comprise, for example, strips of titanium dioxide ($TiO_2$) nano-particles. The hydrophilic properties of $TiO_2$ nano-particles can be activated by a photo-catalytic process. As an alternative, the strips may instead comprise another suitably hydrophilic material, such as silicon dioxide, hydrophilic silicones, siloxanes, silanes and other metal organics having anti-fog properties.

Moisture on the skin causes the magnitude of electro-vibration sensed by the user to be significantly reduced, if not completely eradicated. The hydrophilic strips 30 act to attract and trap moisture from the user's skin as the finger (or other appropriate body part) is moved along the surface of the transparent electro-vibration film 10. Thus, the surface of the user's finger is dried by the hydrophilic strips as it is moved across the surface of the transparent electro-vibration film 10. The magnified view 32 of the hydrophilic layer 110 shows the moisture droplets 322, for example sweat droplets, having been trapped by the hydrophilic strips 30.

The hydrophilic strips 30 may be approximately 20-50 μm in width and spaced apart by a distance of approximately 0.5-1 mm. It will be understood that, unlike in FIG. 4, the hydrophilic strips 30 may not be equidistant, and/or may not form a right-angled grid. For example the mesh of hydrophilic lines/strips can be arranged in a pattern similar to that of a human finger print. This can help to improve sensitivity of the user to electro-vibration.

According to alternative embodiments, the hydrophilic strips 30 may be provided on a substrate comprised of, for example a hard transparent polymer, which is provided atop the protective layer 108.

The electro-vibration apparatus 1, and in particular the transparent electro-vibration film 10 is of very simple construction and comprises no moving parts. Thus, it is relatively easy to manufacture and has a relatively low bill of materials.

Also, the nature of the materials used for the transparent electro-vibration film 10, and its dimensions, allows the film to be bendable and flexible. Thus, the electro-vibration device can be integrated with flexible hand-held display devices.

Furthermore, the power used by the electro-vibration apparatus is very low. This is because the apparatus comprises no moving parts and because most of the energy required to provide the electro-vibration simulation is provided by the user as they move their finger across the surface of the transparent electro-vibration film 10. For example an electro vibrating film having a size of 10 cm×10 cm has total power consumption of approximately 20 μW. The energy required to provide feedback to a user of a touch screen display via the electro-vibration apparatus 1 is several orders of magnitude lower than that required to provide feedback using mechanical and piezo-electric actuators. This is particularly beneficial for hand-held battery powered devices in which preserving power is especially important. This is especially true for modern hand-held devices, such as smart phones and the like, which are being built to perform an ever increasing number of complex functions and operations, and thus the burden on their batteries is always increasing.

The electro-vibration apparatus 1 also provides benefits to the visually impaired as it allows the user to feel by touch what is being shown on the display, even if they cannot see it properly. Furthermore depending on characteristics of the apparatus and at electro-vibration signal frequencies of higher than 600 Hz, the electro-vibration apparatus creates a sound while providing electro-vibration to a user. The frequency of the sound varies with the frequency of the electro-vibration signal. This noise can also be of use in providing an indication of what is being displayed on the display screen. For example, an icon indicating a music or video player may have a electro-vibration signal having a frequency above the threshold for producing noise associated with it. Thus, when the user slides their finger over the video/music player icon, a noise will be generated and this may provide an additional indication to the user as to the identification of the icon.

Figure 5:
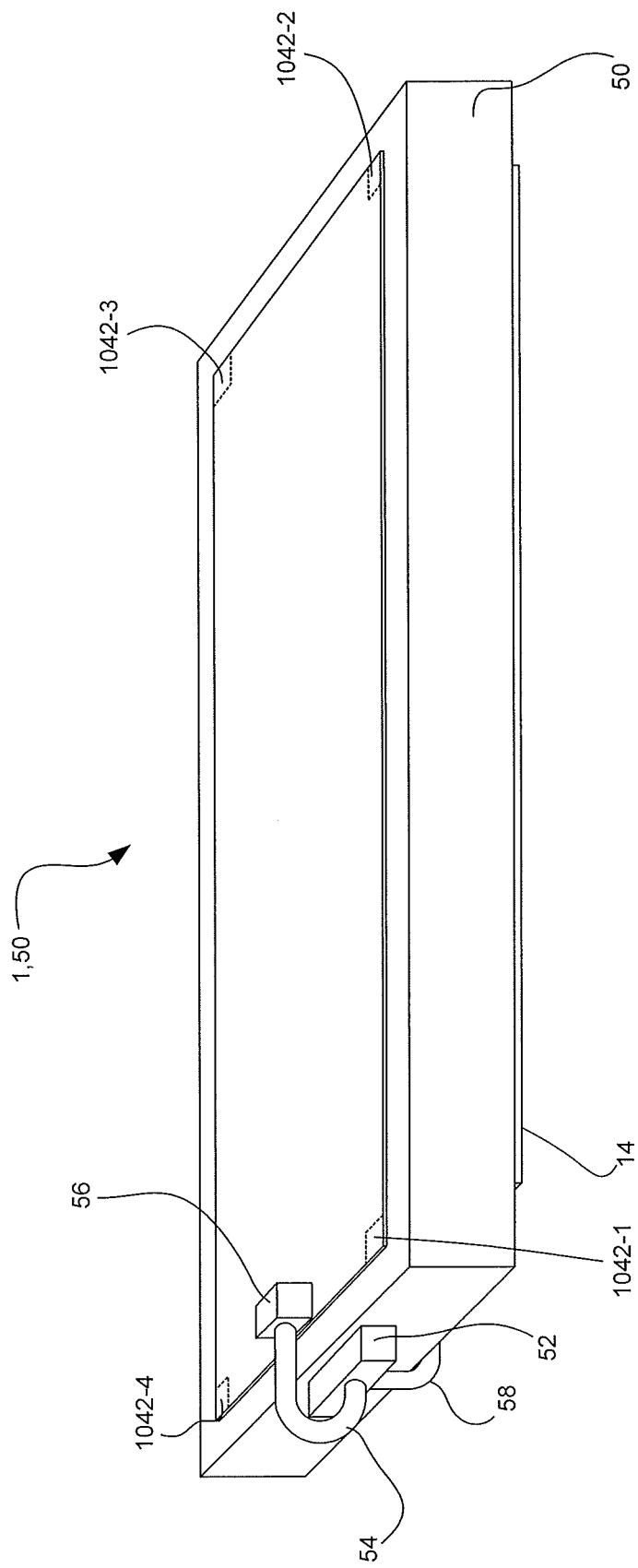
FIG. 5 is a schematic perspective view of another exemplary embodiment of an apparatus for providing tactile feedback to a user of a portable electronic device.

FIG. 5 depicts a first exemplary integration of the electro-vibration apparatus 1 with a hand-held device 50. The hand-held device 50 may be, for example, a mobile phone, a PDA, a GPS receiver or the like. The electro-vibration apparatus 1 may be suitable for use with any device comprising a display, and optionally also requiring user inputs.

In FIG. 5, the electro-vibration apparatus 1 is integrated with a handheld device 50. The electro-vibration apparatus 1 is detachable from the handheld device 50. The transparent electro-vibration film 10 is provided atop a display portion (hidden in the Figure) of the device 50. The transparent electro-vibration film 10 may be affixed to the display potion of the device via an adhesive layer (hidden) provided on a bottom surface of the transparent electro-vibration film 10. Alternatively, the transparent electro-vibration film 10 may be affixed to the display portion in another suitable way, for example, via a clip mechanism.

The apparatus 1 is electrically connected to the hand-held device 50 by a male-plug connector 52, which connects with a corresponding female portion (not shown) of the device 50. The connection may be any connection by which power and data may pass, for example but not limited to, a micro- or mini-USB connection or an audio connection (for instance a headphone socket).

The transparent electro-vibration film 10 is connected to the plug connector 52 via a wire 54 and a connection hub 56 provided in physical communication with the transparent electro-vibration film 10. The connection hub 56 is connected to the contact electrodes 1042 of the conductive electrode layer 104 in any suitable way. Thus, the connection hub 56 can receive signals from, and pass signals to, the contact electrodes 1042. The rear electrode 14 is connected to the plug connector 52 via a second wire 58. The rear electrode can thus receive signals from the connector plug 52 and/or the connection hub 56. The rear electrode 14 is affixed to the rear of the device 50 in any suitable way, for example, using adhesive, clips or the like.

Provision of the rear electrode 14 on the rear of the device 50 allows the user to hold the device in a natural way, for example, with their fingers/palms on the rear of the device whilst providing input with their thumbs. It will be understood that the rear electrode 14 may be located anywhere on the device as long as it is in contact the user's body when the user is touching the transparent electro-vibration film 10.

The feedback processor 16 may be located in any appropriate location, for example, within the housing of the connector plug 52 or in the connection hub 56. The feedback processor 16 receives data regarding the display via the connection with the device.

The implementation of the electro-vibration apparatus 1 of FIG. 5, allows the apparatus to be removed from the device when it is not required by the user. It also allows for existing devices to be integrated with the electro-vibration apparatus 1.

Figure 6:
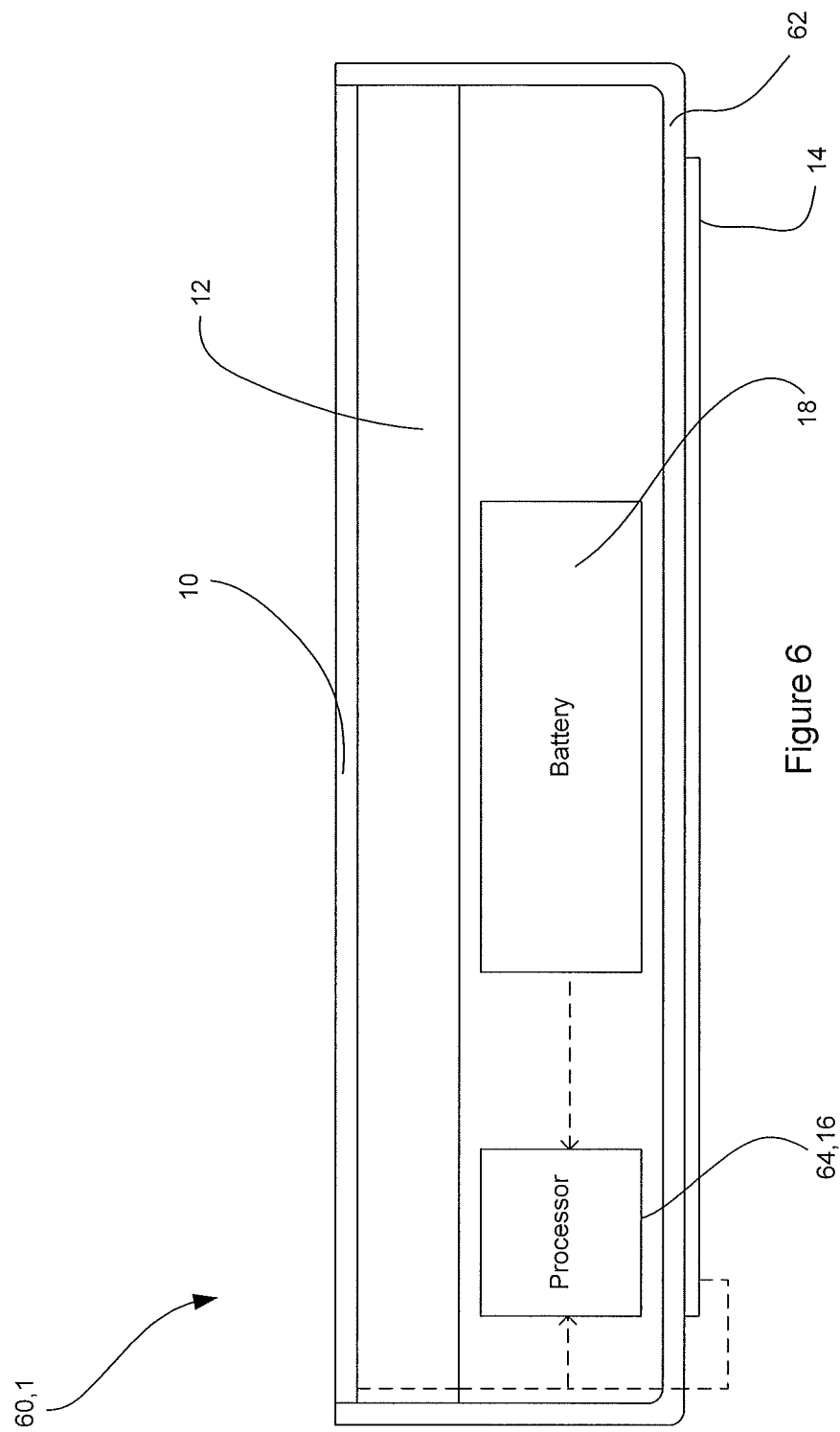
FIG. 6 is a schematic cross-sectional view of another exemplary embodiment of an apparatus for providing tactile feedback to a user of a portable electronic device.

FIG. 6 shows an alternative integration of the electro-vibration apparatus 1 with a hand-held device 60. In FIG. 5, the apparatus 1 is permanently integrated with the device 60, for example during manufacture of the device 60.

FIG. 6 is a cross-section through the device 50. Electrical connections are schematic only and are shown using dashed lines.

Figure 7:
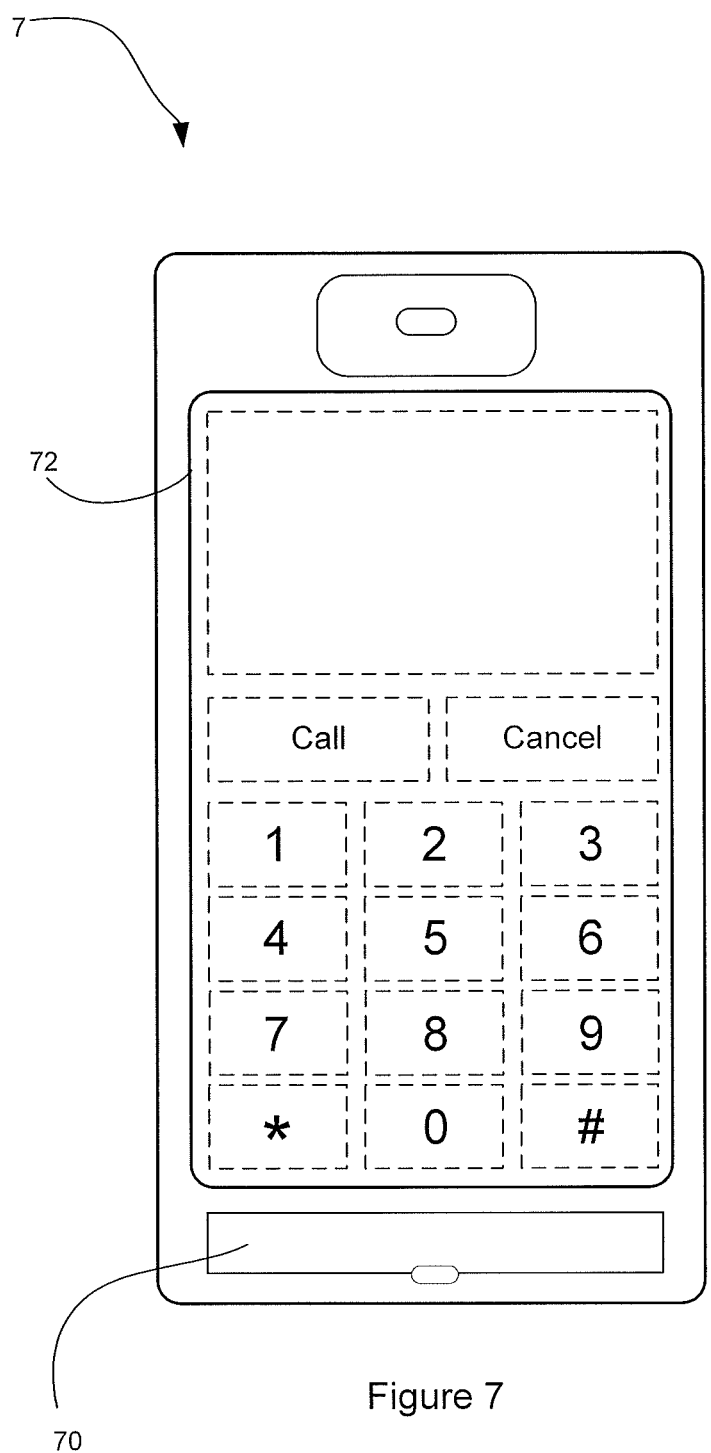
FIG. 7 is plan-view of a mobile communication device including an alternative embodiment of the apparatus of FIG. 1.

The transparent electro-vibration film 10 of the apparatus is provided atop the display panel 12. The rear electrode 14 is provided on the rear side of the device 60. Again, it will be understood that the rear electrode 14 may be provided elsewhere on the device 60. Also, the rear electrode 14 may constitute all or part of the housing 62 of the device. The feedback circuitry 16 is operable to receive power from the battery 18 of the hand-held device 50. In the device of FIG. 7, the feedback circuitry 16 is integrated with the processor which controls the display panel 12 as a single processor. This may be, for example, the main microprocessor which controls the device 60. Alternatively, the feedback circuitry 16 may be separate from and may receive data from the processor which controls the display.

According to alternative embodiments of the electro-vibration apparatus 1, the hydrophilic layer 110 may not be disposed on the surface of the transparent electro-vibration film 10. Alternatively, as shown in FIG. 7, a hydrophilic strip 70, of a similar construction as the hydrophilic layer 110, may be provided to one side of the display region 72, and thus also of the transparent electro-vibration film 10. This allows a user to dry their finger/thumb etc. on the hydrophilic strip prior to touching the transparent electro-vibration film 10.

Although the electro-vibration apparatus 1 has been described in relation to portable electronic devices, the skilled person will appreciate that it also has a number of other applications. For example, it may be used dynamically to provide Braille for the visually impaired. Also, it may be used to provide "blind steering for users of electronic devices. As such, based on the presence/lack of presence of electro-vibration, a user of a device can determine without looking at the display, whether their finger is at an appropriate location on the display. Similarly, the electro-vibration apparatus can be used to indicate to the user that their finger is correctly positioned in, for example, a fingerprint scanner. The electro-vibration apparatus may also be used in relation to computer gaming, in which the current trend is towards authentic human gestures. These may be embellished by a multi-purpose conformal tactile surface, such as can be provided by the electro-vibration apparatus. Also, due to the thin nature of the transparent electro-vibration film 10, it may be incorporated with small objects in order to provide information to, and receive information from the object. Examples of such objects are electronic bank cards and USB memory sticks. For example, electro-vibration could be used to illustrate to a user the amount of money left on the bank card, or the number of files stored on the USB stick. Also, the apparatus may be used to create 3D tactile images, which may be of particular use for maps and the like.

In the above-described embodiments, the electro-vibration film is comprised of plural different layers. However, it will be understood that, according to other exemplary embodiments, the electro-vibration film 10 may not include one or more of the hydrophilic layer 110, the protective layer, the dielectric layer 108, and the substrate layer 102.

As used in this application, the term 'circuitry' refers to all of the following:

hardware-only circuit implementations (such as implementations in only analogue and/or digital circuitry); and to combinations of circuits and software (and/or firmware), such as: (i) to a combination of processor(s) or (ii) to portions of processor(s)/software (including digital signal processor(s)), software, and memory(ies) that work together to cause an apparatus to perform various functions); and to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone, a cellular network device, or other network device.

It should be realised that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. A portable display device comprising:
   an optically transparent sheet comprising an electrically conductive layer;
   an electrode element;
   electro-vibration circuitry connected to the electrically conductive layer and the electrode element, where the electro-vibration circuitry is configured to provide a time-varying voltage signal across the electrically conductive layer, a body of a user, and the electrode element so as to cause a user to experience electro-vibration in a first body part of the user when the first body part is moved across an exterior surface of the optically transparent sheet while a second body part of the user is in contact with the electrode element; and
   a display panel having a display surface, the display panel being configured to display images to a user via the display surface, wherein
   the optically transparent sheet is arranged to overlie at least a portion of the display surface.

2. The portable display device of claim 1, wherein the electrode element is supported on a housing of the portable display device.

3. The portable display device of claim 2, wherein the display surface constitutes a portion of a front exterior surface of the device and wherein the electrode element is provided on a rear exterior surface of the device.

4. Apparatus comprising:
   an optically transparent sheet comprising an electrically conductive layer;
   an electrode element;
   a detector configured to detect a user touch input on the optically transparent sheet; and
   electro-vibration circuitry connected to the electrically conductive layer, the electrode element and the detector, where the electro-vibration circuitry is configured to provide a time-varying voltage signal across the electrically conductive layer, a body of a user, and the electrode element in response to detecting a user touch input on the optically transparent sheet.

5. The apparatus of claim 4, comprising a detector configured to determine a location on the optically transparent sheet of a touch input by measuring parameters relating to the electrically conductive layer.

6. The apparatus of claim 5, wherein the electro-vibration circuitry is configured to provide the time-varying voltage signal across the electrically conductive layer and the electrode element if the location on the optically transparent sheet of the user touch input is coincident with a predetermined location.

7. The apparatus of claim 6, wherein the apparatus further comprises a display panel having a display surface, the display panel being configured to display images to a user via the display surface, wherein the optically transparent sheet layer is arranged to overlie at least a portion of the display surface, and wherein the predetermined location corresponds to a location of an object displayed on the display surface.

8. A method comprising:
   detecting a touch input on an optically transparent sheet, where the optically transparent sheet comprises an electrically conductive layer; and
   in response to detecting a user touch input on the optically transparent sheet, providing a time varying voltage signal across the electrically conductive layer, a body of a user, and an electrode element.

9. The method of claim 8 further comprising:
   determining a location on the optically transparent sheet of the user touch input, by measuring parameters relating to the electrically conductive layer;
   comparing the location on the optically transparent sheet of the user touch input with one or more predetermined locations;
   providing the time varying voltage signal across the electrically conductive layer and the electrode element, in response to determining that the determined location of the user touch input is coincident with one of the one or more predetermined locations.

10. Computer executable code stored on a computer-readable medium, which, when executed by computer apparatus causes the computer apparatus to perform the method of claim 8.

11. Apparatus comprising:
    an optically transparent sheet comprising an electrically conductive layer;
    an electrode element; and
    electro-vibration circuitry connected to the electrically conductive layer and the electrode element, where the electro-vibration circuitry is configured to provide a time-varying voltage signal across the electrically conductive layer, a body of a user, and the electrode element so as to cause the user to experience electro-vibration in a first body part of the body when the first body part is moved across an exterior surface of the optically transparent sheet while a second body part of the body is in contact with the electrode element.

12. The apparatus of claim 11, comprising a detector configured to detect a contact of the first body part on the exterior surface of the optically transparent sheet by detecting a current in the electrically conductive layer.

13. The apparatus of claim 12, where the electro-vibration circuitry is configured to provide the time-varying electric voltage signal across the electrically conductive layer and the electrode element in response to the detector detecting the contact of the first body part on the exterior surface of the optically transparent sheet.

14. The apparatus of claim 11 further comprising a contact location detector configured to determine a location of contact between the first body part and the exterior surface of the optically transparent sheet by measuring parameters relating to the electrically conductive layer.

15. The apparatus of claim 14, wherein the electro-vibration circuitry is configured to provide the time-varying electric voltage signal across the electrically conductive layer and the electrode element if the location of contact between the first body part and the exterior surface of the optically transparent sheet is coincident with a predetermined location.

16. The apparatus of claim 11, further comprising a hydrophilic member for removing moisture from the first body part.

17. The apparatus of claim 16, wherein the hydrophilic member comprises an arrangement of hydrophilic strips.

18. The apparatus of claim 16, wherein the hydrophilic member constitutes at least a portion of the exterior surface of the optically transparent sheet.

19. The apparatus of claim 11, wherein the optically transparent sheet further comprises a layer of dielectric material provided between the electrically conductive layer and the exterior surface of the optically transparent sheet.

20. The apparatus of claim 11, wherein the optically transparent sheet further comprises a layer of scratch-resistant material provided between the electrically conductive layer and the exterior surface of the optically transparent sheet.

21. The apparatus of claim 1, where the optically transparent sheet comprises a dielectric layer covering the electrically conductive layer.

* * * * *